(12) United States Patent
Tachiwa

(10) Patent No.: US 10,356,794 B2
(45) Date of Patent: *Jul. 16, 2019

(54) COMMUNICATION SYSTEM AND COMMUNICATION METHOD, COMMUNICATION APPARATUS AND CONTROL METHOD FOR THE SAME, AND STORAGE MEDIUM

(71) Applicant: CANON KABUSHIKI KAISHA, Tokyo (JP)

(72) Inventor: Wataru Tachiwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/908,996

(22) Filed: Mar. 1, 2018

(65) Prior Publication Data

US 2018/0242303 A1 Aug. 23, 2018

Related U.S. Application Data

(63) Continuation of application No. 14/853,201, filed on Sep. 14, 2015, now Pat. No. 9,949,270.

(30) Foreign Application Priority Data

Oct. 2, 2014 (JP) ................................ 2014-204214

(51) Int. Cl.
*H04W 72/04* (2009.01)
*H04W 48/00* (2009.01)
(Continued)

(52) U.S. Cl.
CPC .......... *H04W 72/048* (2013.01); *H04W 4/70* (2018.02); *H04W 4/80* (2018.02); *H04W 48/00* (2013.01); *H04W 84/12* (2013.01); *H04W 84/18* (2013.01)

(58) Field of Classification Search
None
See application file for complete search history.

(56) References Cited

U.S. PATENT DOCUMENTS

| 8,040,841 B2 | 10/2011 | Ono |
| 8,463,238 B2 | 6/2013 | Forstall et al. |

(Continued)

FOREIGN PATENT DOCUMENTS

| CN | 101860935 A | 10/2010 |
| EP | 1215853 A2 | 6/2002 |

(Continued)

OTHER PUBLICATIONS

Apr. 5, 2017 Office Action in Russian patent application No. 2015141796.

(Continued)

*Primary Examiner* — Angel T Brockman
(74) *Attorney, Agent, or Firm* — Venable LLP

(57) ABSTRACT

In a communication system including a first apparatus and a second apparatus, the first apparatus transmits to the second apparatus a signal that requests information for connecting to a network. Then, in response to receiving the signal from the first apparatus, the second apparatus determines whether or not another apparatus connectable to the network is present within a communicable range of the second apparatus, and when determining that the other apparatus is present in the communicable range, the second apparatus notifies the first apparatus of information for connecting to the other apparatus. The first apparatus receives from the second apparatus the information for connecting to the other apparatus, and connects to the other apparatus and to the network, based on the received information.

9 Claims, 10 Drawing Sheets

(51) Int. Cl.
*H04W 4/70* (2018.01)
*H04W 4/80* (2018.01)
*H04W 84/12* (2009.01)
*H04W 84/18* (2009.01)

(56) References Cited

U.S. PATENT DOCUMENTS

| | | |
|---|---|---|
| 8,761,118 B2 | 6/2014 | Aibara et al. |
| 8,831,007 B2 | 9/2014 | Asai et al. |
| 9,949,270 B2 * | 4/2018 | Tachiwa .............. H04W 72/048 |
| 2010/0254349 A1 | 10/2010 | Aibara |
| 2012/0213092 A1 | 8/2012 | Sun et al. |
| 2012/0257536 A1 | 10/2012 | Kholaif et al. |
| 2013/0237148 A1 | 9/2013 | McCann et al. |
| 2013/0297069 A1 | 11/2013 | Tachiwa |
| 2014/0028816 A1 | 1/2014 | Brockway, III |
| 2015/0208457 A1 | 7/2015 | Thanayankizil et al. |

FOREIGN PATENT DOCUMENTS

| | | |
|---|---|---|
| JP | 2006311137 A | 11/2006 |
| JP | 2010245748 A | 10/2010 |
| JP | 2014027384 A | 2/2014 |
| RU | 2276461 C2 | 5/2006 |
| RU | 2467479 C2 | 11/2012 |
| WO | 2013162538 | 10/2013 |
| WO | 2013162538 A1 | 10/2013 |
| WO | 2013184110 | 12/2013 |

OTHER PUBLICATIONS

European Search Report dated Oct. 29, 2015.
counterpart office action, European Application No. 15184278.8 dated Nov. 7, 2016.
Japanese Office Action issued in corresponding Japanese Application No. 2014204214 dated Aug. 3, 2018.

* cited by examiner

COMMUNICATION SYSTEM AND COMMUNICATION METHOD, COMMUNICATION APPARATUS AND CONTROL METHOD FOR THE SAME, AND STORAGE MEDIUM

BACKGROUND OF THE INVENTION

Field of the Invention

The present invention relates to communication setting technology for wireless communication.

Description of the Related Art

In recent years, an increasing number of products such as digital cameras are equipped with a communication function that uses a wireless local area network (LAN). Consequently, using the communication function, a digital camera, for example, is capable of uploading a captured image to a server on the Internet so that a plurality of users can share the captured image. To transmit data to the Internet by using a wireless LAN, the user of the camera needs to perform an operation to connect the camera to one of the access points (APs) of the wireless LAN that are located in the proximity of the camera. In other words, the user of the camera needs to input the identifier of an AP, or connection parameters including security system information, a password, etc., to the camera, and cause the camera to start connecting to the AP, in a location where the camera can communicate with the AP.

Meanwhile, an increasing number of mobile communication devices such as smartphones are now equipped with a communication function that uses a cellular system and a wireless LAN, and also near field communication (NFC), Bluetooth® low energy (BLE), etc. Note that NFC is a communication standard that is suitable for, upon a touch operation as a trigger, transmitting and receiving data within a short period for which the device is being touched. Also note that BLE is a communication standard that is suitable for maintaining intermittent communication in which, for example, one communication sequence occurs every second or so, over a long period, with low power consumption.

Smartphones have a user interface that is suitable for inputting characters, and in general, inputting connection parameters from these devices is easier than performing similar inputting from cameras in many cases. Furthermore, many smartphones have the function of automatically finding and connecting to a connectable AP by using, for example, connection parameters obtained by reading a QR code (TM), or connection parameters input in the past. However, it is not easy to equip cameras with a function that is similar to the function of smartphones for reasons such as the cost, size, etc.

In this regard, using a camera having the function of receiving the connection parameters of a wireless LAN from a smartphone by NFC, the user can input the connection parameters to the camera and connect the camera to the wireless LAN by simply touching the camera to the smartphone. As such technology, Japanese Patent Laid-open No. 2010-245748 discloses a technology by which a terminal device that is connected to an AP transmits the connection parameters for the AP to a camera by NFC, and the camera connects to the same AP. Note that equipping a camera with such a function does not greatly influence the cost, size, etc., of the camera because the only function to be added to the camera is the NFC communication function.

However, when using the technology disclosed in Japanese Patent Laid-open No. 2010-245748 or the like, the user of the camera needs to perform an operation to start transferring the connection parameters by NFC in a state in which a connectable AP is present in its proximity and the smartphone has the connection parameters for the AP. In other words, when performing a touch operation, the user needs to know that a connectable AP is present in the proximity, and the smartphone has the connection parameters for the AP, which impairs the convenience for the user.

The present invention is made in view of the above problem, and in a communication system including a plurality of apparatuses among which information used for connecting to another apparatus is exchanged, the present invention provides a technology for improving user convenience when the information used for the connection is exchanged.

SUMMARY OF THE INVENTION

According to one aspect of the present invention, there is provided a communication system that includes a first communication apparatus and a second communication apparatus, the first communication apparatus comprising: a communication unit configured to transmit to the second communication apparatus a signal that requests information for connecting to a network, and receive from the second communication apparatus information for connecting to another communication apparatus that is connectable to the network; and a connection unit configured to connect to the other communication apparatus based on the received information, and connect to the network via the other communication apparatus, the second communication apparatus comprising: an accepting unit configured to accept the signal from the first communication apparatus; a determination unit configured to, in response to accepting the signal, determine whether or not the other communication apparatus is present within a communicable range; and a notification unit configured to notify the first communication apparatus of the information for connecting to the other communication apparatus in the case that the other communication apparatus is determined to be present within the communicable range.

According to another aspect of the present invention, there is provided a communication apparatus, comprising: an accepting unit configured to accept a signal that has been transmitted from a first other communication apparatus and that requests information for connecting to a network; a determination unit configured to determine whether or not a second other communication apparatus connectable to the network is present within a communicable range in response to accepting the signal; and a notification unit configured to notify the first other communication apparatus of the information for connecting to the second other communication apparatus in the case that the second other communication apparatus is determined to be present within the communicable range.

Further features of the present invention will become apparent from the following description of embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Each of the embodiments of the present invention described below can be implemented solely or as a combination of a plurality of the embodiments or features thereof where necessary or where the combination of elements or features from individual embodiments in a single embodiment is beneficial.

Embodiment 1

Wireless Communication System

Figure 1:
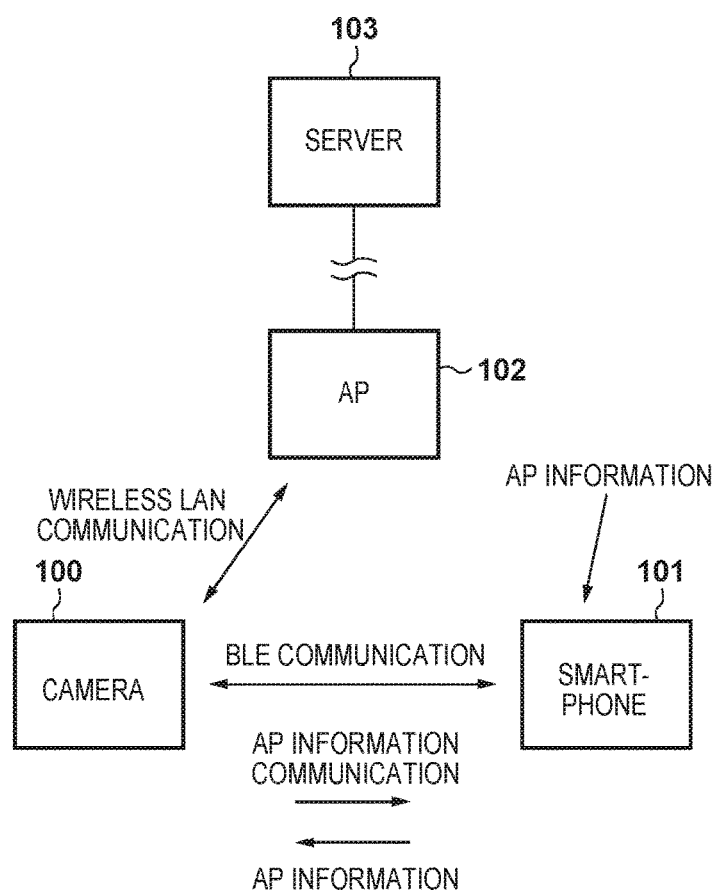
FIG. 1 is a diagram showing an example of a configuration of a wireless communication system.

FIG. 1 shows an example of the configuration of a wireless communication system according to the present embodiment. In this wireless communication system, a camera 100, for example, uploads captured image data to a server 103 on a network (e.g. the Internet) via an access point (AP) 102 of a wireless LAN. The camera 100 obtains AP information, which is for connecting to the AP 102, from a smartphone 101 by wireless communication that is based on the Bluetooth low energy (BLE) communication standard. The AP information includes, for example, information indicating that the AP 102 is present in the proximity of the smartphone 101 at the timing when the AP information is transmitted, and connection parameters used for connecting to the AP 102. The connection parameters include, for example, the AP identifier of the AP 102, information indicating the security system type of the AP 102, and password information required to connect to the AP 102 by using the security system. An AP identifier is, for example, the identifier that identifies an AP, or the identifier of a wireless LAN network formed by an AP, and a service set identifier (SSID) or the like may be used as an AP identifier. Serving as a terminal in the wireless LAN, the camera 100 connects to the AP 102 based on the AP information.

Note that, in the following description, it is the camera 100 and the smartphone 101 that perform communication for establishing a wireless LAN connection between the camera 100 and the AP 102, but these are merely examples, and other devices having the communication function may be used. In other words, the following accounts apply to, in general terms, any system in which a first communication apparatus and a second communication apparatus perform communication for establishing a connection between the first communication apparatus and a third communication apparatus. Also note that the "third communication apparatus" mentioned above is not necessarily a particular communication apparatus, and may be any communication apparatus that can connect to the server 103 on the network. In other words, the third communication apparatus may be, for example, an access point of a wireless LAN that is connected to a wired network and establishes a wireless network, or a communication apparatus that is capable of connecting to a network for wirelessly connecting to the server 103.

Furthermore, although the following provides a description of a case in which the camera 100 and the smartphone 101 perform communication by BLE and communication between the camera 100 or the smartphone 101 and the AP 102 is performed via a wireless LAN, this is not a limiting description by any means. In other words, the camera 100 or the smartphone 101 and the AP 102 may perform communication with each other via a wireless network that uses a method other than the wireless LAN method, and the camera 100 and the smartphone 101 may perform communication with each other by using a method other than the BLE method. Also, in the case where a wireless LAN is used, the wireless LAN to be used may be a wireless LAN complying with the series of IEEE 802.11 standards for example, or any of the past, present, or future wireless LANs. Similarly, other communication methods to be used may be any of the past, present, or future methods.

Outline of BLE Communication

Figure 2:
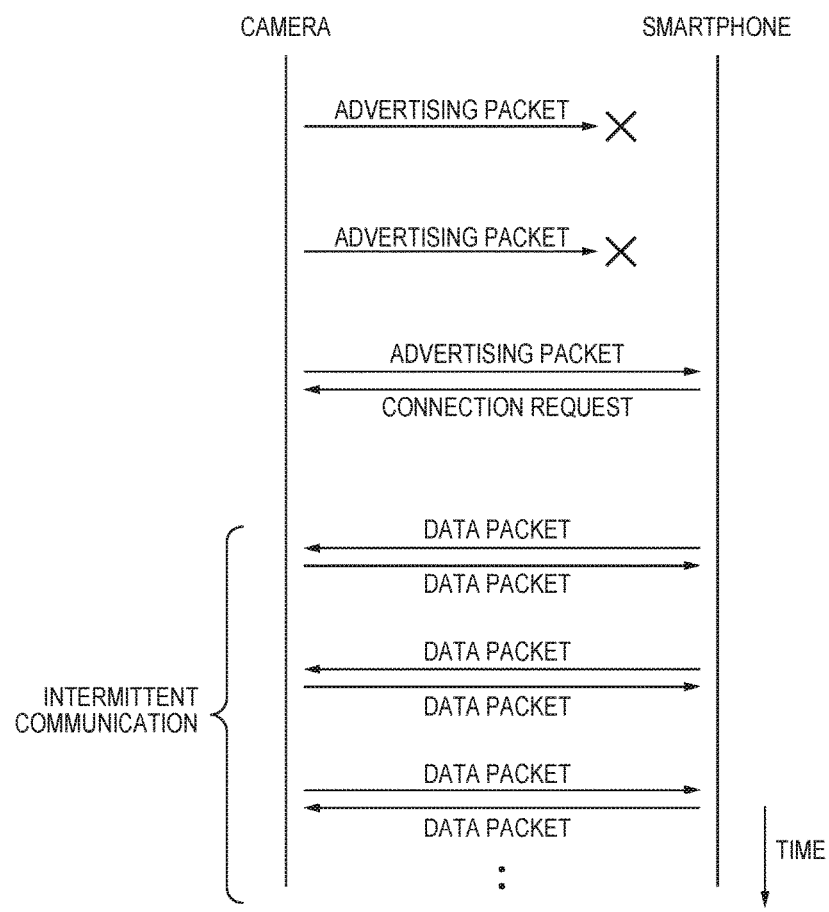
FIG. 2 is a sequence diagram showing a flow of BLE communication.

Next, a description is given of the flow of BLE communication performed between the camera 100 and the smartphone 101 in the wireless communication system according to the present embodiment. FIG. 2 is a sequence diagram showing an example of the flow of BLE communication performed by the camera 100 and the smartphone 101.

In this example, first, the camera 100 repeatedly and periodically transmits an advertising packet at predetermined intervals. The advertising packet mentioned here is, for example, a packet used for finding the other party performing BLE communication, in order to obtain the AP information that is necessary for the camera 100 to connect to another communication apparatus (e.g. the AP 102) that is used for connecting to a network. Upon receiving the advertising packet from the camera 100, the smartphone 101 transmits a connection request to the camera 100.

Consequently, a BLE communication connection is established between the camera 100 and the smartphone 101, and thereafter a transition to intermittent communication occurs, by which data packets are periodically exchanged at predetermined intervals. Note that in order to perform intermittent communication in synchronization with each other, the camera 100 needs to obtain from the smartphone 101 information about the timing of starting intermittent communication, and information about the intervals of the intermittent communication, and these pieces of information are contained in the connection request packet. Also note that when there is no data to be transmitted to the other party, the camera 100 and the smartphone 101 exchange data packets at the intervals of the intermittent communication. The communication apparatus on the transmission side transmits information indicating whether or not data to be transmitted is contained in the data packet by including the information in the data packet, and the communication apparatus on the reception side can determine whether or not the packet includes significant data by checking the information.

When it is necessary to connect to the AP 102 (connect to the network), the camera 100 requests the smartphone 101 for the AP information by using the data packet for the subsequent sequence of intermittent communication. Note that the AP information requested here is not necessarily the information of the particular AP 102, and may be information of any AP that can connect to the network. Therefore, this request for the AP information can be regarded as a signal indicating that the camera 100 wishes to connect to the network. In other words, the data packet in this case can be regarded as a signal for notifying the smartphone 101 that the camera 100 wishes to connect to the network.

After receiving this request, upon detecting that an AP (e.g. the AP 102) that can connect to the network is present in the proximity, the smartphone 101 transmits the AP information of the AP by using the data packet for the sequence of intermittent communication that is subsequent to the timing of detection. Note that "proximity" mentioned here is the communicable range for the smartphone 101 via the wireless LAN. As described above, this AP information includes, for example, information indicating that the AP 102 is present in the proximity of the smartphone 101 at the timing when the AP information is transmitted, and connection parameters used for connecting to the AP 102.

Note that since the communicable range of BLE communication has a sufficiently short distance, if the AP 102 is present in the proximity of the smartphone 101, it can be estimated that the camera 100, which is the communication partner to the smartphone 101 by BLE communication, is also present in the proximity of the AP 102. Therefore, by being notified that the smartphone 101 has detected the AP 102 in its proximity, and being provided with the AP information of the AP 102, the camera 100 can connect to the AP 102, and can connect to, for example, the server 103 via the AP 102.

Here, if the intervals of intermittent communication are long, there is the possibility that during the period from when the smartphone 101 detects the presence of the AP 102 in its proximity to when the subsequent sequence of the intermittent communication occurs, the user holding the smartphone 101 moves to a location where the smartphone 101 cannot perform wireless LAN communication with the AP 102. Therefore, the intervals of the intermittent communication may be set with consideration of the movement of the smartphone 101, and may be set to approximately 1 second, for example.

Note that the smartphone 101 has ordinary functions required to obtain the AP identifiers of APs in its proximity. In other words, the smartphone 101 has, for example, the function of obtaining the AP identifiers by performing a passive scan prescribed by the wireless LAN standard, and receiving a beacon that is periodically transmitted from each AP in its proximity. Furthermore, the smartphone 101 has a user interface, from which the user makes an instruction to perform a passive scan. Note that the smartphone 101 may have the function of automatically performing a scan, instead of the user interface, or in addition to the user interface. Furthermore, the smartphone 101 may have the function of automatically performing a scan when it is in a location where an AP is likely to be present, by using positional information.

Furthermore, the smartphone 101 has ordinary functions required to obtain the connection parameters other than the AP identifier as well, with respect to one AP out of the APs in its proximity. In other words, the smartphone 101 has, for example, the function of displaying a list of the AP identifiers found by a passive scan, and an acceptance function, which is the function of allowing the user to select one of the AP identifiers and accepting user input of the security system and password corresponding to the selected AP. Note that the acceptance function may be, for example, a software or hardware keyboard function, or the function of capturing and analyzing a QR code or the like. Also, the smartphone 101 may have the function of storing input content accepted in the past so that thereafter input of the same content by the user can be avoided.

Configuration and Operation of Camera

Figure 3:
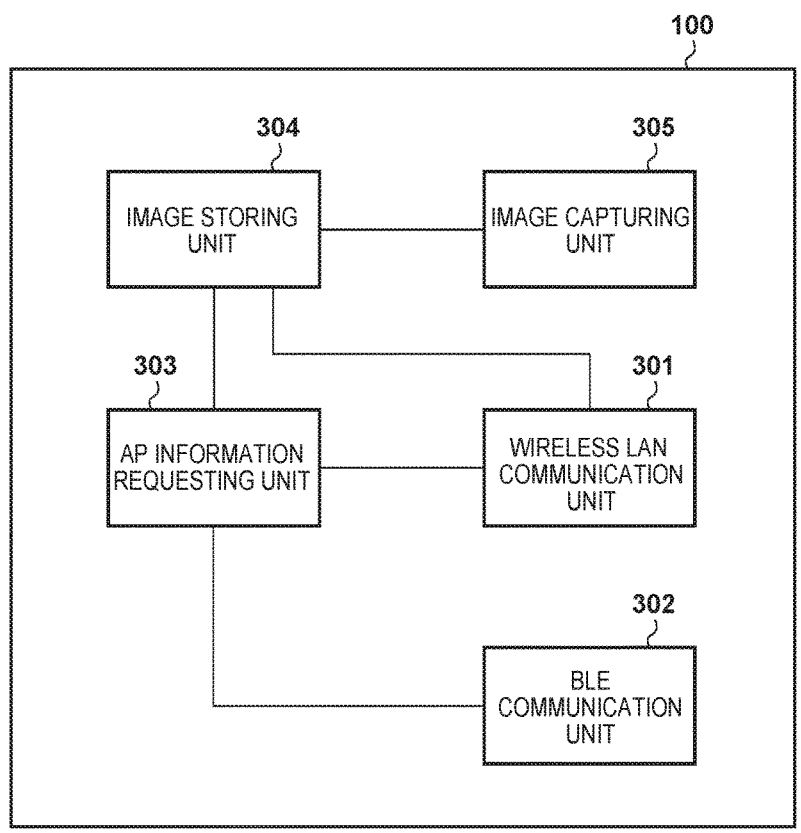
FIG. 3 is a block diagram showing an example of a functional configuration of a camera 100.

Next, a description is given of an example of the configuration of the camera 100 and the flow of processes performed by the camera 100. FIG. 3 is a block diagram showing an example of the functional configuration of the camera 100. The camera 100 includes, for example, a wireless LAN communication unit 301, a BLE communication unit 302, an AP information requesting unit 303, an image storing unit 304, and an image capturing unit 305. Note that functions not related to the present embodiment, such as a calling function, are not depicted in the drawing, and their description has been omitted.

The wireless LAN communication unit 301 includes, for example, an ordinary antenna, a modulation and demodulation function, and a protocol processing function, which are required for wireless LAN communication, and the wireless LAN communication unit 301 connects to the AP 102, reads out image data stored in the image storing unit 304 for example, and transmits it to the AP 102. Note that the image data transmitted to the AP 102 is transferred to the server 103, via a network for example. The BLE communication unit 302 includes, for example, an ordinary antenna, a modulation and demodulation function, and a protocol processing function, which are required for BLE communication, and, as described above, the BLE communication unit 302 establishes a connection with the smartphone 101 by BLE communication and performs intermittent communication with the smartphone 101.

The AP information requesting unit 303 obtains the AP information from the smartphone 101 by using the BLE communication unit 302, and, based on the AP information, outputs the timing at which the wireless LAN communication unit 301 connects to the AP 102, and the connection parameters for the AP 102, to the wireless LAN communication unit 301. The wireless LAN communication unit 301 connects to the AP 102 according to these pieces of information.

The image storing unit 304 stores, for example, image data captured by the image capturing unit 305. The image capturing unit 305 performs image capturing according to a user operation, generates image data, and stores it to the image storing unit 304. Note that the image storing unit 304 can store the image data of not only one image, but of a plurality of images.

Note that the camera 100 may have, for example, hardware modules constituting at least one CPU, at least one ROM, at least one RAM, and so on, which are not shown in FIG. 3, and the CPU may perform the processes represented by the flowchart described below by executing a program stored in the ROM.

Figure 4:
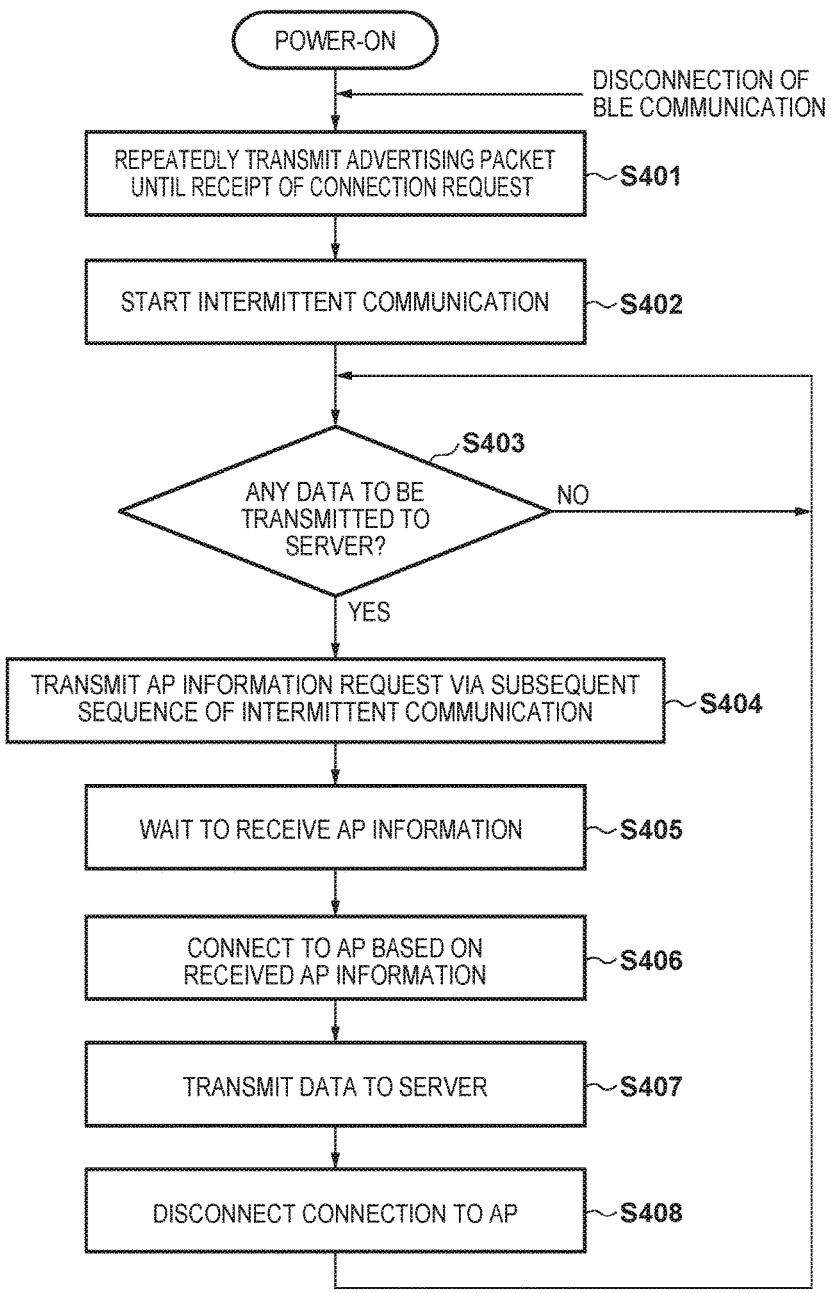
FIG. 4 is a flowchart showing a flow of processes performed by an AP information requesting unit 303 of the camera 100.

FIG. 4 shows the flow of the processes performed in the camera 100, particularly by the AP information requesting unit 303. The AP information requesting unit 303 starts its operation when triggered by the turning on of the power of the camera. The AP information requesting unit 303 repeatedly transmits the advertising packet at predetermined intervals by using the BLE communication unit 302 (step S401), and starts periodically transmitting/receiving signals via intermittent communication in response to receiving a connection request from the smartphone 101 (step S402).

After that, the AP information requesting unit 303 determines whether or not there is any data to be transmitted to the server 103 (step S403). Here, the data to be transmitted to the server may be, for example, image data in the image storing unit 304, which has not been transmitted yet, or image data specified by the user. Upon the occurrence of data to be transmitted (YES in step S403), the AP information requesting unit 303 controls the BLE communication unit 302 to transmit the AP information request by using the data packet for the subsequent sequence of the intermittent communication (step S404). Then, the AP information requesting unit 303 waits to receive the AP information from the smartphone 101 via a subsequent sequence of the intermittent communication (step S405).

Then, upon receiving the AP information, the AP information requesting unit 303 controls the wireless LAN communication unit 301 so that it connects to the AP 102 by using the connection parameters contained in the AP information thus received, thereby connecting the camera 100 to the AP 102 (step S406). Next, the AP information requesting unit 303 controls the wireless LAN communication unit 301 so that it transmits the data to be transmitted, which has been determined in step S403, to the server 103 via the AP 102 (step S407). Then, upon completing the transmission of the data to be transmitted, the AP information requesting unit 303 controls the wireless LAN communication unit 301 so that it disconnects the connection with the AP 102 (step S408), and awaits the next occurrence of data to be transmitted (step S403).

Note that it is not necessary for the AP information requesting unit 303 to perform a control to disconnect the connection with the AP (step S408) immediately after transmitting the data to be transmitted to the server 103 (step S407). In other words, the AP information requesting unit 303 may wait for a predetermined period of time after the data to be transmitted has been transmitted to the server 103 (step S407), thereby confirming that there will be no data to be additionally transmitted to the server, and then disconnect the connection with the AP (step S408). If it is determined within this predetermined period that there is further data to be transmitted to the server 103, the AP information requesting unit 303 transmits this further data as well (step S407). Consequently, it is possible to avoid unnecessarily disconnecting and/or re-establishing the connection via the wireless LAN. Note that even while performing any of the steps above, the AP information requesting unit 303 goes back to step S401 whenever BLE communication with the smartphone 101 is disconnected. In other words, while BLE communication is maintained after the request for the AP information has been transmitted, it is possible to confirm that the camera 100 wishes to connect to the network, unless the request is cancelled for a particular reason. However, if BLE communication is disconnected, it will be impossible to confirm that, and accordingly the processing will be reset in such a case.

Note that if the camera 100 is not notified of the AP information despite maintaining the connection over the predetermined period by BLE communication, the camera 100 may determine not to make an attempt to connect to the network for a while, and disconnect BLE communication. Then, after another predetermined period has elapsed, the camera 100 may establish BLE communication again, and make a request for the AP information. Consequently, it is possible to prevent the camera 100 from continuously performing periodic transmission/reception of signals via BLE in a situation where the connection with the AP cannot be established, which leads to a reduction in power consumption by the camera 100.

Configuration and Operation of Smartphone

Figure 5:
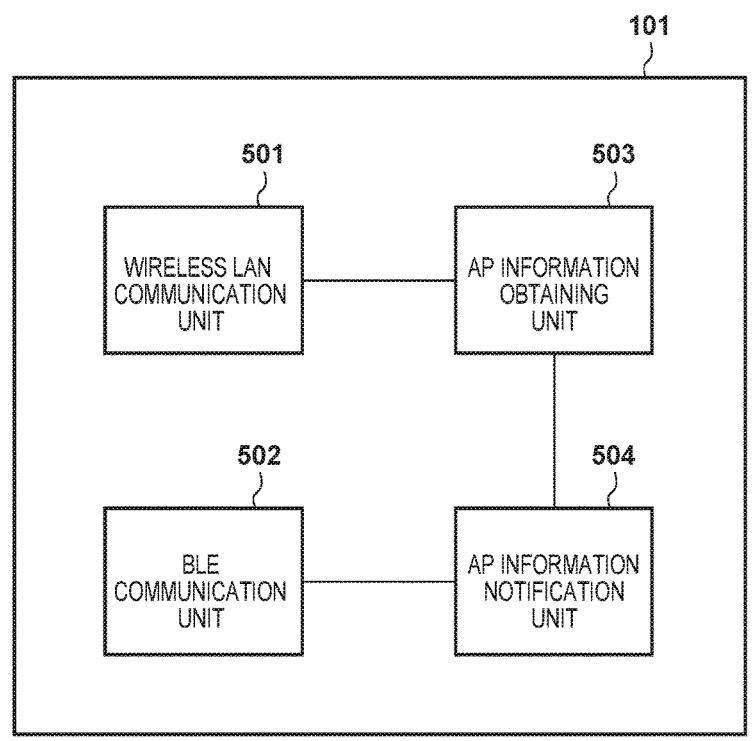
FIG. 5 is a block diagram showing an example of a functional configuration of a smartphone 101.

Next, a description is given of an example of the functional configuration of the smartphone 101 and the flow of processes performed by the smartphone 101. FIG. 5 is a block diagram showing an example of the functional configuration of the smartphone 101. The smartphone 101 includes, for example, a wireless LAN communication unit 501, a BLE communication unit 502, an AP information obtaining unit 503, and an AP information notification unit 504. Note that functions not directly related to the present embodiment, such as a calling function, are not depicted in the drawing, and their description has been omitted from that of FIG. 5.

The wireless LAN communication unit 501 and the BLE communication unit 502 are respectively similar to the wireless LAN communication unit 301 and the BLE communication unit 302, and each has an ordinary antenna, a modulation and demodulation function, and a protocol processing function, which are required for wireless LAN communication and BLE communication. The AP information obtaining unit 503 has ordinary functions required to obtain the AP identifiers of APs in the proximity of the smartphone 101, and the connection parameters of one of the APs in its proximity, as described above. By using these functions, after receiving the request for the AP information from the camera 100, the AP information obtaining unit 503 detects the AP 102 in its proximity and obtains the connection parameters used for connecting to the AP 102. The AP information notification unit 504 notifies the camera 100 of the AP information obtained by the AP information obtaining unit 503 based on the AP information request received from the camera 100 via the BLE communication unit 502. The AP information serves as a response to the request. Note that the smartphone 101 may have, for example, hardware modules constituting at least one CPU, at least one ROM, at least one RAM, and so on, which are not shown in FIG. 5, and the CPU may perform the processes represented by the flowchart described below by executing a program stored in the ROM.

Figure 6:
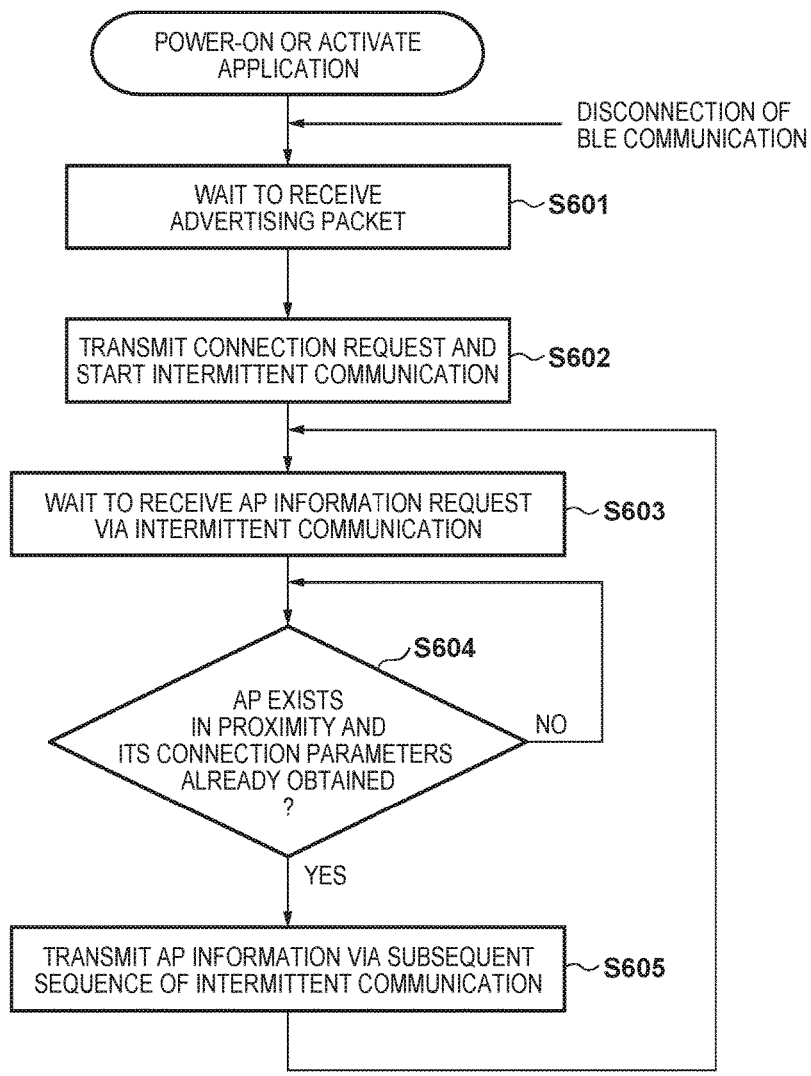
FIG. 6 is a flowchart showing a flow of processes performed by an AP information notification unit 504 of the smartphone 101.

FIG. 6 shows the flow of the processes performed in the smartphone 101, particularly by the AP information notification unit 504. The AP information notification unit 504 starts its operation when triggered by the turning on of the smartphone 101, or the activation of predetermined application software in the smartphone 101. The AP information notification unit 504 first waits to receive an advertising packet from the camera 100 by using the BLE communication unit 502 (step S601). Then, upon receiving the advertising packet, the AP information notification unit 504 transmits a connection request to the camera 100, and starts periodic transmission/reception of packets via intermittent communication by BLE (step S602). Next, the AP information notification unit 504 waits to receive a request for the AP information from the camera 100 via intermittent communication by BLE (step S603).

Upon receiving the request for the AP information, the AP information notification unit 504 inquires the AP information obtaining unit 503 as to whether or not the AP 102 is present in the proximity (e.g. the communicable range of the smartphone 101), and as to whether or not its connection parameters have been obtained (step S604). Note that the AP information obtaining unit 503 performs a search after receiving the request for the AP information from the camera 100, for example, in order to determine whether or not the AP is present in the proximity of the smartphone 101. Also, the AP information obtaining unit 503 may determine whether or not an AP is present in the proximity of the smartphone 101 according to whether or not there is an AP to which the smartphone 101 connects. Note that in the case of performing a search for an AP, the AP information obtaining unit 503 also performs the process of obtaining the connection parameters for connecting to the AP found in the search. On the other hand, when there is an AP that is connected, it is unnecessary for the AP information obtaining unit 503 to newly obtain connection parameters because the purpose can be satisfied by notification of the connection parameters that are being used for the connection.

When the AP 102 is present in the proximity and its connection parameters have been obtained (YES in step S604), the AP information notification unit 504 controls the BLE communication unit 502 so that it transmits the AP information over the subsequent sequence of intermittent communication (step S605). After that, the AP information notification unit 504 goes back to step S603, and waits to receive a request for the AP information again. The AP information includes, for example, information indicating that the AP 102 is present in the proximity at the timing when the AP information is transmitted, and the connection parameters used for connecting to the AP 102.

On the other hand, when the AP 102 is not present in the proximity, or its connection parameters have not been obtained (NO in step S604), the AP information notification unit 504 waits until the AP 102 is present in the proximity and its connection parameters are obtained. Note that even while performing any of the steps above, the AP information notification unit 504 goes back to step S601 whenever BLE communication with the camera 100 is disconnected. In other words, while BLE communication is maintained after the request for the AP information has been received, it is possible to confirm that the camera 100 wishes to connect to the network, unless the request is cancelled for a particular reason. However, if BLE communication is disconnected, it will be impossible to confirm that, and accordingly the processing will be reset in such a case.

Figure 7:
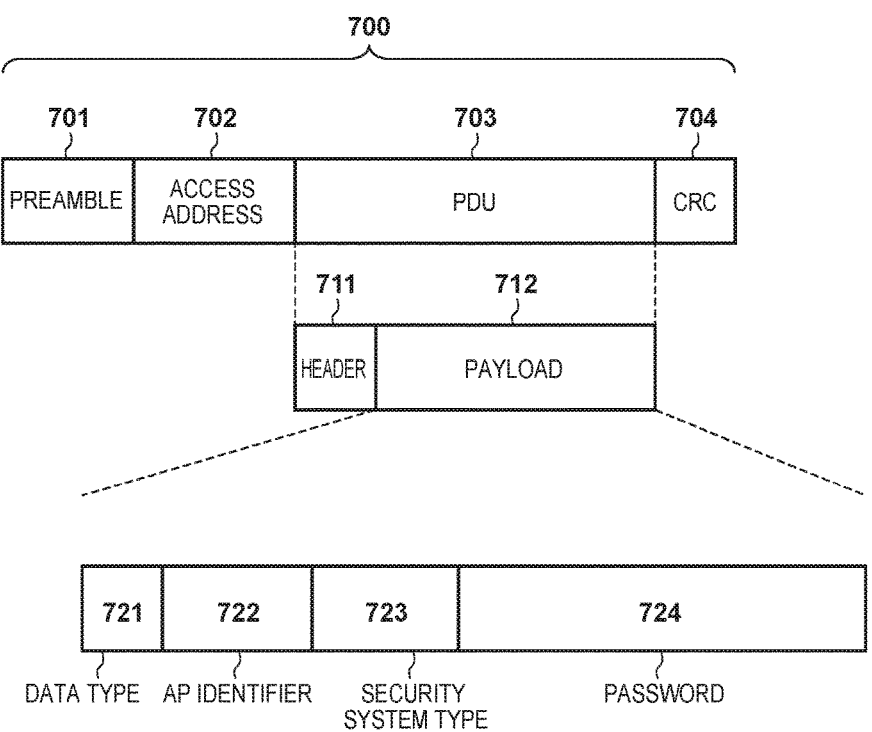
FIG. 7 is a diagram showing an example of a format for AP information transmitted from the smartphone 101.

Here, a description is given of the format for the AP information transmitted from the smartphone 101, with reference to FIG. 7. In FIG. 7, a data packet 700 is a BLE data packet including AP information. The data packet 700 includes a preamble 701, an access address 702, a PDU (Protocol Data Unit) 703, and a CRC (Cyclic Redundancy Check) 704. The preamble 701 is used for determining the beginning of the packet. The access address 702 represents that communication is performed between the camera 100 and the smartphone 101. The CRC 704 is used for error detection, and is calculated based on the content of the PDU 703.

Here, the PDU 703 is configured to include a header 711 and a payload 712, and the header 711 includes information indicating that this packet is a data packet, and information indicating the length of the payload 712. When there is no data to be transmitted via intermittent communication, this length is 0. However, in a data packet including the AP information, the value of the length is equal to or greater than 1. The payload 712 includes a data type 721, an AP identifier 722, a security system type 723, and a password 724. The data type 721 stores a value indicating that this data packet includes AP information. The information indicated by the connection parameters for the AP identified by the AP identifier 722 is stored in the AP identifier 722, the security system type 723, and the password 724.

Upon receiving this data packet, the camera 100 can find out that the data packet includes AP information by reading the value of the data type 721, and accordingly can find out the timing at which the AP information has been transmitted. In other words, the data type 721 is information indicating whether or not the AP specified by the AP identifier 722 is present in the proximity (communicable range) of the smartphone 101 at the timing of the transmission of the data packet.

Note that according to the BLE communication standard, the header 711 may also include information indicating whether or not it is followed by a data packet. When the size of the connection parameters is large, the connection parameters may be divided into a plurality of data packets by using the information before being transmitted. Also, the AP information requesting unit 303 may transmit the request for the AP information in the form of a data packet from the camera 100 to the smartphone 101 as with the above case, by setting the value of the data type 721 in the PDU to be a value indicating that this data packet is a request for the AP information.

Note that the data packet format above is merely an example, and the AP information may be transmitted in other formats.

Flow of Processes Performed in Wireless Communication System

Figure 8:
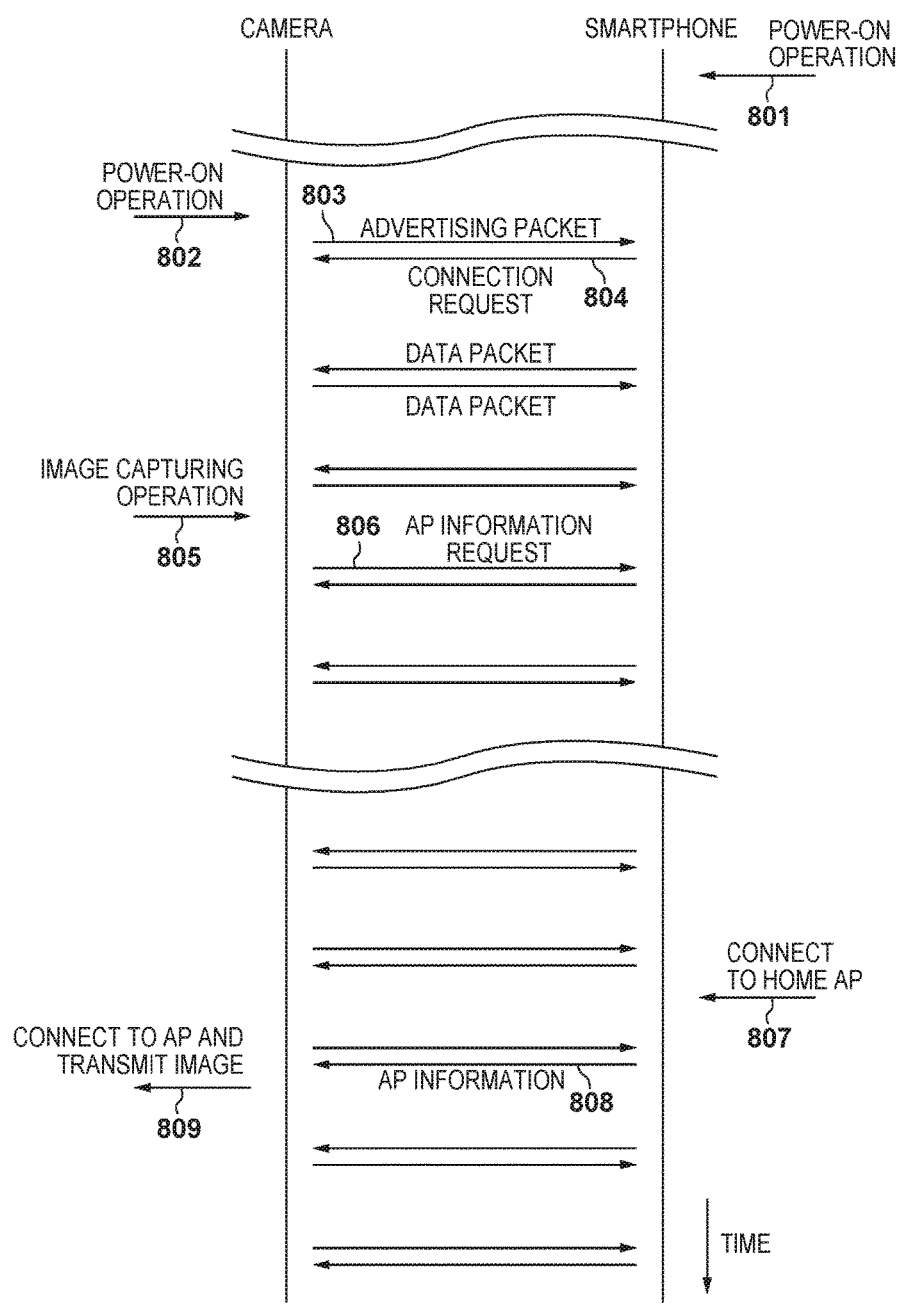
FIG. 8 is a sequence diagram showing an example of a flow of processes performed by the camera 100 and the smartphone 101.

Next, a description is given of the flow of the processes performed between the camera 100 and the smartphone 101, with reference to FIG. 8. Note that the following describes, for example, a case where the user goes out carrying the camera 100 and the smartphone 101, captures an image with the camera 100, and goes back home, and then the smartphone 101 connects to the AP at the home.

First, in response to the user turning on the power of the smartphone 101 at time 801, the smartphone 101 enters into the state of waiting to receive an advertising packet (step S601). Next, in response to the user turning on the power of the camera 100 at time 802, an advertising packet is transmitted from the camera 100 at time 803 (step S402). In response to this advertising packet, the smartphone 101 transmits a connection request at time 804 (step S602). Consequently, intermittent communication between the camera 100 and the smartphone 101 via BLE starts (step S403, step S602), and the smartphone 101 enters into the state of waiting for a request for the AP information from the camera 100 (step S603).

After that, when the user performs an image capturing operation with the camera 100 at time 805, image data to be transmitted occurs in the camera 100. Accordingly, the camera 100 transmits a request for the AP information to the smartphone 101 by the sequence of the intermittent communication at time 806, and comes into the state of waiting to receive the AP information (steps S403 to S405). Upon receiving the request for the AP information, the smartphone 101 comes into the state of waiting for the presence of an AP within the communicable range of the smartphone 101 itself, and waiting for obtaining the AP information of the AP (step S604).

When the user goes back home at time 807, the smartphone 101 connects to the AP at the user's home as operated by the user or automatically, and consequently the smartphone 101 enters into the situation where an AP is present in its proximity and the connection parameters for the AP have been obtained. Accordingly, the smartphone 101 transmits the AP information to the camera 100 at time 808 when the subsequent sequence of the intermittent communication occurs (step S605). At the time of receiving the AP information, the camera 100 can recognize the presence of a connectable AP in its proximity, and simultaneously, it can obtain the connection parameters for the AP. Accordingly, at time 809, the camera 100 connects to the AP that corresponds to the AP information notified by the smartphone 101, and transmits the captured image to the server on the network via the AP (step S406, step S407). After that, upon completing the data transmission, the camera 100 disconnects the connection with the AP (step S408).

As described above, although only the power-on operation at the time 802 and the image capturing operation at the time 805 are the operations performed by the user on the camera 100, the camera 100 can automatically connect to the AP at the user's home and transmit the image to the server. Note that the connecting of the smartphone 101 to the AP at the user's home at the time 807 is, in many cases, performed manually or automatically regardless of the presence of the camera 100. This is because wireless LAN communication, when compared to cellular communication, is faster and cheaper, and allows users to use services such as calling and data communication almost in the same manner as with cellular communication, and, in many cases, wireless LAN communication is preferentially used by smartphones in locations where an AP is present. Therefore, according to the wireless communication system according to the present embodiment, it is possible to connect the camera to the network without performing an operation that is solely for connecting the camera to the wireless LAN, and thus user convenience is improved. Also, the camera according to the present embodiment can be realized by simply adding only the BLE communication function to an ordinary camera, which does not cause a significant increase in size or cost compared to adding the NFC communication function.

Embodiment 2

In Embodiment 1, an example is described in which the camera 100 transmits a request for AP information used for connecting to an AP that can connect to the network without specifying the AP. In contrast, in the present embodiment a case is described where the camera 100 specifies a particular AP, and makes a request for the AP information of the particular AP.

Figure 9:
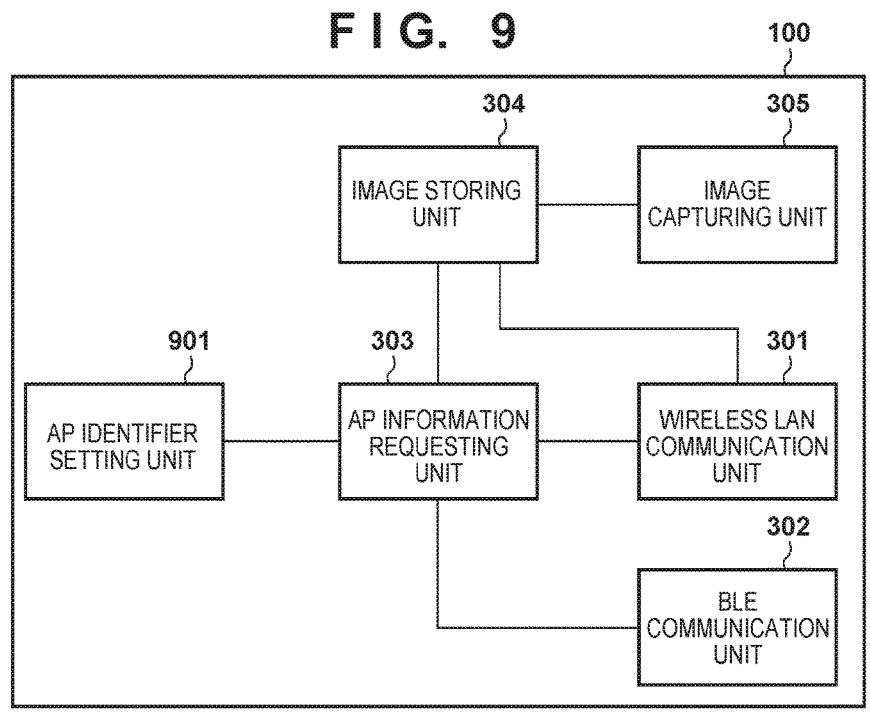
FIG. 9 is a block diagram showing another example of the functional configuration of the camera 100.

FIG. 9 shows an example of the functional configuration of the camera 100 according to the present embodiment. The camera 100 according to the present embodiment has a similar configuration to the configuration represented by the block diagram shown in FIG. 3 described for Embodiment 1, except that an AP identifier setting unit 901 is added. Therefore, the following describes the differences from Embodiment 1, and the description of the parts having similar functions as in Embodiment 1 has been omitted.

Figure 10:
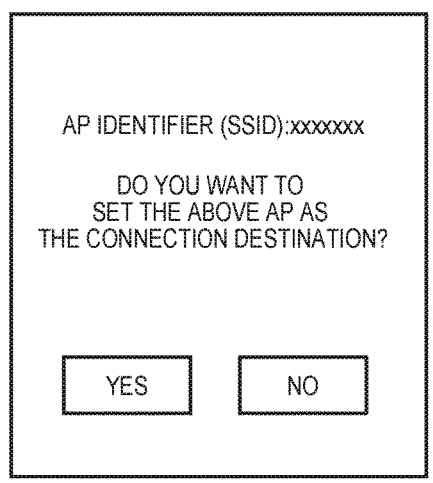
FIG. 10 is a diagram showing an example of a screen displayed by an AP identifier setting unit 901.

The AP identifier setting unit 901 has an interface for, when the AP information requesting unit 303 detects in step S406 shown in FIG. 4 that AP information is obtained, displaying a screen as shown in FIG. 10 and accepting an operation, based on the AP identifier contained in the AP information. In other words, the AP identifier setting unit 901 has the function of showing connectable APs to the user, and obtaining the designation of an AP to connect to from the user. Furthermore, the AP identifier setting unit 901 stores the connection parameters contained in the AP information when the user selects "YES" in FIG. 10. Then, the AP identifier setting unit 901 controls the AP information requesting unit 303 so that, when transmitting an AP information request later in step S404, the AP information requesting unit 303 transmits the AP information request together with the AP identifier, which is contained in the connection parameters, by including it in the AP information request.

Figure 11:
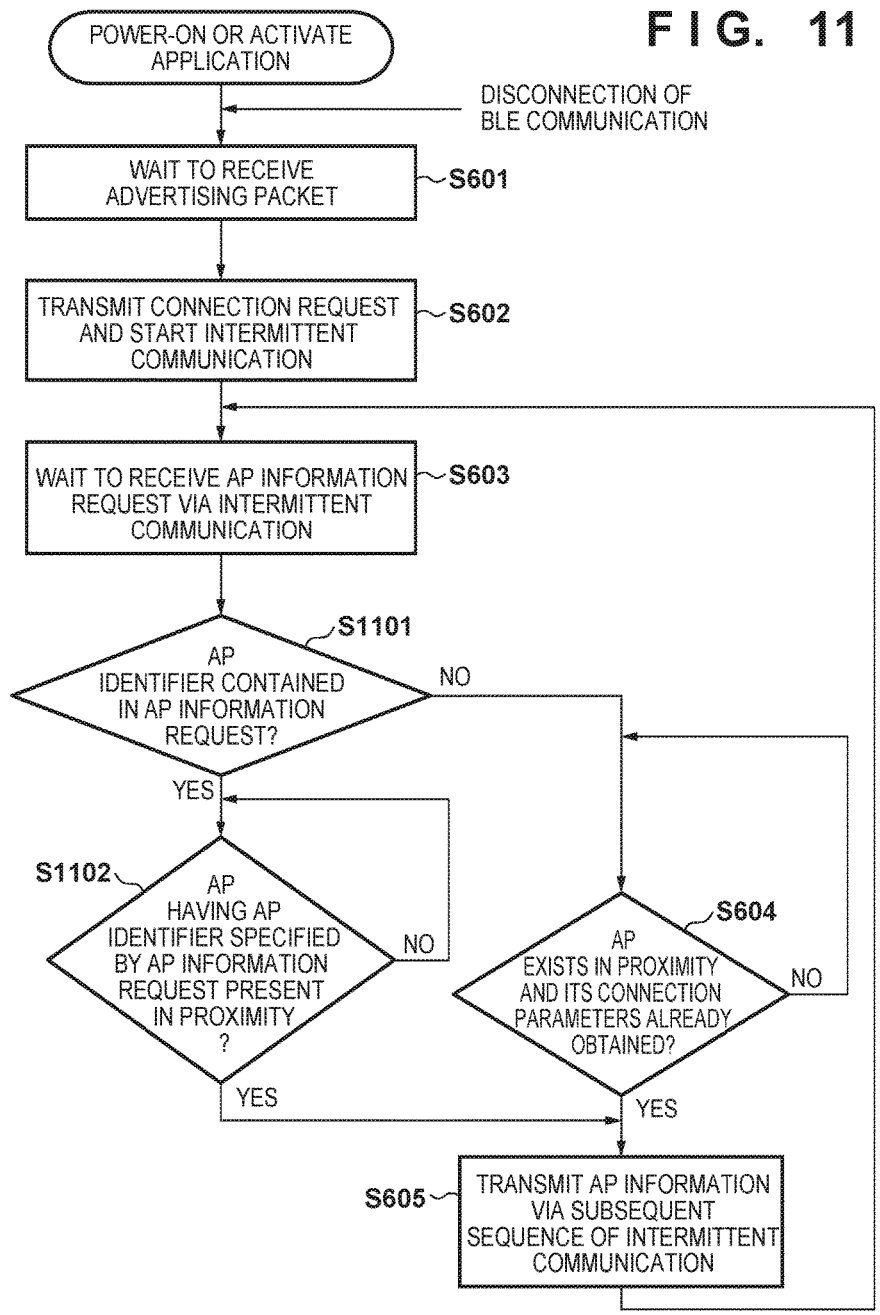
FIG. 11 is a flowchart showing a flow of other processes performed by the AP information notification unit 504 of the smartphone 101.

FIG. 11 is a flowchart showing the flow of processes performed by the AP information notification unit 504 of the smartphone 101 according to the present embodiment. Note that in FIG. 11 the steps of performing the same process as in FIG. 6 are given the same reference numbers, and the description of them has been omitted unless necessary.

After waiting to receive an AP information request via intermittent communication (step S603), the AP information notification unit 504 determines whether or not the received AP information request contains an AP identifier (step S1101). Then, when the AP information request does not contain an AP identifier (NO in step S1101), the AP information notification unit 504 proceeds to step S604, and performs the same processes as in Embodiment 1. On the other hand, when an AP identifier is contained (YES in step S1101), the AP information notification unit 504 waits until the AP information obtaining unit 503 detects that the AP having the AP identifier is present in its proximity (step S1102). Then, upon the detection of the AP by the AP information obtaining unit 503 (YES in step S1102), the AP information notification unit 504 proceeds to step S605, and transmits its AP information to the camera 100. Note that in this case there is the possibility that the camera 100 is holding the connection parameters for the AP because the AP information to be transmitted is that of the AP that has been specified from the camera 100. In this case, namely the case where the camera 100 is holding the connection parameters for the detected AP, it is unnecessary for the smartphone 101 to transmit the connection parameters when transmitting the AP information.

In this way, the AP information notification unit 504 notifies only of the AP information of the AP that has the AP identifier specified from the camera 100. In other words, by storing the information of the AP at home to the camera 100 by using the interface shown in FIG. 10, the user can enable the camera 100 to connect only to the AP at home from then on. Consequently, the user can perform uploading from the camera 100 to the server via the AP at home, which has a relatively stable connection status, and it is therefore possible to reduce the possibility that uploading results in failure due to connection to an AP having an unstable connection status while the user is moving outside the home.

In each of the embodiments above, it has been explained that a request for AP information can be transmitted in the form of a data packet, in which the data type 721 having a predetermined value is included in the PDU. However, according to the BLE communication standard, a request for AP information can be included in the PDU of an advertising packet, in a similar format. Therefore, a request for AP information may be transmitted in the form of an advertising packet instead of a data packet. Furthermore, when BLE communication between the camera 100 and the smartphone 101 is not used for any other purpose, transmission of an advertising packet in which the PDU does not contain the data type 721 may be regarded as transmission of a request for AP information. In both cases, in response to receiving the advertising packet, the smartphone 101 can determine that it has received a request for AP information.

In addition, in each of the embodiments above, it is assumed that the AP information notification unit 504 waits until the AP information obtaining unit 503 obtains the AP information in step S604 in FIG. 6 either according to a user operation or automatically. Instead of performing this process, the AP information notification unit 504 may request the AP information obtaining unit 503 to perform a passive scan when receiving a request for AP information via intermittent communication in step S603. Consequently, when a connectable AP is present in the proximity when the user captures an image, the user can connect the camera to the AP immediately after capturing the image, and upload the captured image to the server.

Furthermore, when the BLE communication unit 302 is implemented in the camera 100 as an independent communication module, the AP information requesting unit 303 may transition to the sleep state after transmitting a request for AP information in step S404 in FIG. 4. Note that, after transmitting a request for AP information, the camera 100 may cause, not only the AP information requesting unit 303, but also some of the functions of the camera 100, except for the functions of the BLE communication unit 302, to transition to the sleep state. In other words, some independent communication modules output an interruption signal when receiving a data packet that is not empty. By using this interruption signal as a wakeup signal, it is possible to reduce the power consumption of the camera 100 during the period from the time 806 in FIG. 8, at which a request for AP information is transmitted, to the time 808, at which the AP information is received. Consequently, the frequency with which the user charges the battery of the camera can be reduced, and the convenience can be improved.

According to the present invention, in a communication system including a plurality of apparatuses among which information used for connecting to another apparatus is exchanged, user convenience when the information used for the connection is exchanged can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2014-204214, filed Oct. 2, 2014, which is hereby incorporated by reference herein in its entirety.

What is claimed is:

1. A communication apparatus, comprising:
a communication unit configured to perform wireless communication in accordance with a first wireless communication method and a second wireless communication method, wherein the second wireless communication method consumes lower power than the first wireless communication method;
a connection unit configured to connect to another communication apparatus using the second wireless communication method;
a search unit configured to search for a specified apparatus using the first wireless communication method; and
an ending unit configured to end to search for the specified apparatus in a case where a connection with the other communication apparatus using the second wireless communication method is disconnected.

2. The apparatus according to claim 1, wherein the specified apparatus is an apparatus that is capable of accessing to a sever on the Internet.

3. The apparatus according to claim 1, wherein the specified apparatus is an access point of a wireless LAN.

4. The apparatus according to claim 1, wherein the specified apparatus is an apparatus that is designated by the other communication apparatus.

5. The apparatus according to claim 4, further comprising a receiving unit configured to receive, from the other communication apparatus, identification information of the specified apparatus using the second communication method,
wherein the search unit searches for the specified apparatus based on the received identification information.

6. The apparatus according to claim 1, wherein the first communication method is a wireless LAN compliant with IEEE802.11 standard series, and the second wireless communication method is Bluetooth.

7. The apparatus according to claim 1, further comprising a notification unit configured to notify, using the second communication method, the other communication apparatus of information of the specified apparatus that is found by the search unit.

8. A control method for controlling a communication apparatus that includes a communication unit configured to perform wireless communication in accordance with a first wireless communication method and a second wireless communication method, wherein the second wireless communication method consumes lower power than the first wireless communication method, comprising:

connecting to another communication apparatus using the second wireless communication method;

searching for a specified apparatus using the first wireless communication method; and ending to search for the specified apparatus in a case where a connection with the other communication apparatus using the second wireless communication method is disconnected.

9. A non-transitory computer-readable storage medium storing a computer program for causing a computer provided in a communication apparatus, which includes a communication unit configured to perform wireless communication in accordance with a first wireless communication method and a second wireless communication method, wherein the second wireless communication method consumes lower power than the first wireless communication method, to execute a control method, the control method comprising:

connecting to another communication apparatus using the second wireless communication method;

searching for a specified apparatus using the first wireless communication method; and ending to search for the specified apparatus in a case where a connection with the other communication apparatus using the second wireless communication method is disconnected.

* * * * *